(12) United States Patent
Metzger et al.

(10) Patent No.: US 8,375,785 B2
(45) Date of Patent: Feb. 19, 2013

(54) GRAVITY GRADIOMETER SYSTEM

(75) Inventors: Thomas Metzger, Wheatfield, NY (US); David L. Sieracki, Depew, NY (US); Daniel E. Dosch, Hamburg, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1026 days.

(21) Appl. No.: 12/206,305

(22) Filed: Sep. 8, 2008

(65) Prior Publication Data

US 2009/0064778 A1    Mar. 12, 2009

Related U.S. Application Data

(60) Provisional application No. 60/970,505, filed on Sep. 6, 2007.

(51) Int. Cl.
     *G01V 7/00*      (2006.01)
(52) U.S. Cl. ..................................... 73/382 G
(58) Field of Classification Search ................ 73/382 G, 73/382 R, 383
See application file for complete search history.

(56) References Cited

U.S. PATENT DOCUMENTS

| | | | | |
|---|---|---|---|---|
| 3,727,462 A * | 4/1973 | Stone et al. | ................ | 73/382 R |
| 4,992,656 A * | 2/1991 | Clauser | ........................ | 250/251 |
| 5,339,684 A * | 8/1994 | Jircitano et al. | ............ | 73/178 R |
| 5,357,802 A * | 10/1994 | Hofmeyer et al. | .......... | 73/382 G |
| 5,402,340 A * | 3/1995 | White et al. | ...................... | 702/5 |
| 5,922,951 A * | 7/1999 | O'Keefe et al. | ............ | 73/382 G |
| 5,962,781 A * | 10/1999 | Veryaskin | ................... | 73/382 G |
| 6,082,194 A * | 7/2000 | Gladwin | ..................... | 73/382 G |
| 6,125,698 A * | 10/2000 | Schweitzer et al. | ........ | 73/382 G |
| 6,212,952 B1 | 4/2001 | Schweitzer et al. | | |
| 6,615,660 B1 * | 9/2003 | Feinberg et al. | ............ | 73/382 R |
| 6,658,935 B1 | 12/2003 | Feinberg | | |
| 6,799,459 B2 * | 10/2004 | Dosch et al. | ................ | 73/382 G |
| 6,883,372 B2 * | 4/2005 | van Leeuwen et al. | ...... | 73/382 G |
| 7,181,967 B2 * | 2/2007 | Lee | ............................ | 73/382 G |
| 7,444,867 B2 * | 11/2008 | Brett et al. | .................. | 73/382 R |
| 7,555,398 B2 * | 6/2009 | Fowler | .......................... | 702/104 |
| 7,788,975 B2 * | 9/2010 | Brett et al. | .................. | 73/382 R |
| 7,938,003 B2 * | 5/2011 | Van Kann et al. | .......... | 73/382 G |
| 7,942,054 B2 * | 5/2011 | Van Kann et al. | .......... | 73/382 G |
| 7,975,544 B2 * | 7/2011 | Van Kann et al. | .......... | 73/382 G |
| 7,980,130 B2 * | 7/2011 | Kann et al. | .................. | 73/382 G |
| 8,033,170 B2 * | 10/2011 | Van Kann | ................... | 73/382 G |
| 8,074,366 B2 * | 12/2011 | Jiang | ............................. | 33/391 |
| 8,074,515 B2 * | 12/2011 | Van Kann et al. | .......... | 73/382 G |
| 8,079,258 B1 * | 12/2011 | Sapuppo | .................... | 73/504.02 |
| 2003/0209070 A1 * | 11/2003 | Dosch et al. | ................ | 73/382 G |
| 2009/0044621 A1 * | 2/2009 | Brett et al. | .................. | 73/382 R |

\* cited by examiner

*Primary Examiner* — Peter Macchiarolo
*Assistant Examiner* — Samir M Shah
(74) *Attorney, Agent, or Firm* — Howard IP Law Group, PC (57) ABSTRACT

A method and apparatus for an improved gravity gradiometer are disclosed.

7 Claims, 6 Drawing Sheets

GRAVITY GRADIOMETER SYSTEM

STATEMENT OF RELATED CASES

This case claims priority of U.S. Pat. Application Ser. No. 60/970,505 filed Sep. 6, 2007, which is incorporated by reference herein.

FIELD OF THE INVENTION

The present invention relates to gravity gradiometers.

BACKGROUND OF THE INVENTION

Gravitational potential is a scalar quantity that represents the energy associated with a unit mass in a gravitational field. The gravitational field is a vector field that describes the spatial variations in potential. In the context of the Earth, local variations in the gravity field are caused, for example, by deviations in the surface of the Earth from a geometric sphere, surface and subsurface geology, water tides, atmospheric tides, and the change in the relative position of the earth, moon, and the sun.

Figure 1:
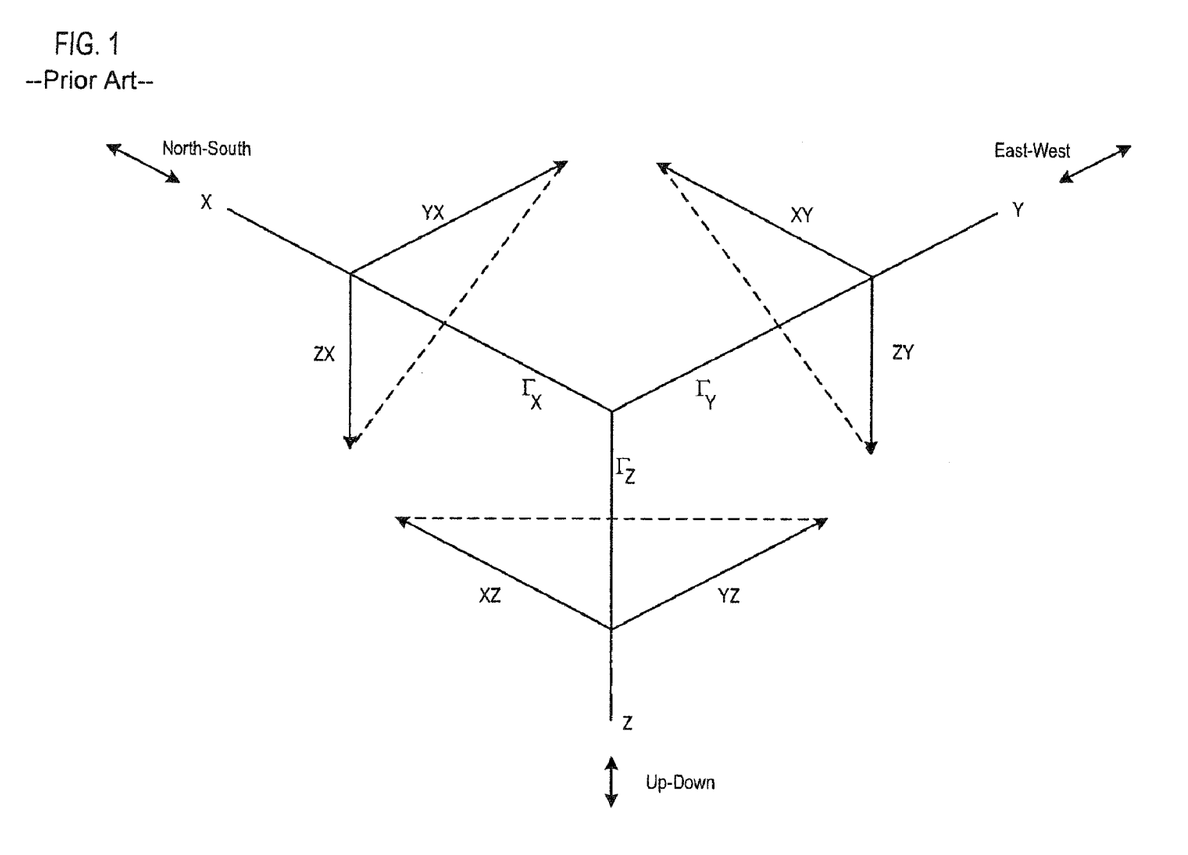
FIG. 1 depicts a conventional three-axis coordinate system showing gravity vectors and tensors.

A gravitational field can be decomposed into three mutually-orthogonal components $\Gamma_x$, $\Gamma_y$, $\Gamma_z$ shown in FIG. 1. For reference, a coordinate system is used in which the X-axis corresponds to the north-south alignment, the Y-axis corresponds to the east-west alignment, and the Z-axis corresponds to the up-down alignment. The z vector ($\Gamma_z$) will have the largest magnitude and the x, y vectors ($\Gamma_x$, $\Gamma_y$) will have respective magnitudes that are a function of the location of the observation point relative to any mass inhomogeneities.

Each of the three vector components $\Gamma_x$, $\Gamma_y$, $\Gamma_z$ of the gravity field has a gradient parallel to each of the three mutually-perpendicular coordinate axes. The gradient describes the rate of change of a vector as a function of movement in the three orthogonal directions. For example, the gradient $$\frac{\partial \Gamma_x}{\partial y}$$

describes how the $\Gamma_x$ vector changes with movement in the y direction.

The full gravity gradient tensor, $\Gamma_{ij}$, is a matrix of nine components or gradients formed by the three orthogonal components of gravity force ($\Gamma_x$, $\Gamma_y$, $\Gamma_z$) as they change along three orthogonal spatial directions (x, y, z), as defined below:

$$\begin{matrix} \frac{\partial \Gamma_x}{\partial x} & \frac{\partial \Gamma_x}{\partial y} & \frac{\partial \Gamma_x}{\partial z} \\ \frac{\partial \Gamma_y}{\partial x} & \frac{\partial \Gamma_y}{\partial y} & \frac{\partial \Gamma_y}{\partial z} \\ \frac{\partial \Gamma_z}{\partial x} & \frac{\partial \Gamma_z}{\partial y} & \frac{\partial \Gamma_z}{\partial z} \end{matrix} \quad [1]$$

Gravity is a conservative field, and some of the fundamental properties of it are that:

$$\frac{\partial \Gamma_x}{\partial y} = \frac{\partial \Gamma_y}{\partial x}, \frac{\partial \Gamma_x}{\partial z} = \frac{\partial \Gamma_z}{\partial x}, \frac{\partial \Gamma_y}{\partial z} = \frac{\partial \Gamma_z}{\partial y} \quad [2]$$

$$\frac{\partial \Gamma_x}{\partial x} + \frac{\partial \Gamma_y}{\partial y} + \frac{\partial \Gamma_z}{\partial z} = \text{constant} \quad [3]$$

As a consequence of expressions [2] and [3], only five of the nine tensor elements shown at [1] are independent.

The measurement of the spatial variations (gradients) of the gravity field is known as "gravity gradiometry." The gravity gradient is a gradient of acceleration and so the appropriate units are acceleration units divided by distance units; that is, (meter/sec$^2$)/meter. Typical gravity gradients (e.g., as measured during exploration, etc.) are exceedingly small, and are usually measured as nanoseconds squared, where: 1 ns$^{-2}$=10$^{-9}$ s$^{-2}$=1 Eötvös unit (Eo).

The device that is used to measure these gradients, such as occurs when traversing the Earth's terrain (see, FIG. 3, terrain 36) or moving past a massive object, is known as a "gravity gradiometer." In a typical gravity gradiometer, plural opposed pairs of accelerometers are moved at a constant velocity along an orbital path about a spin axis. Information from each accelerometer, which is in the form of a sinusoidally-varying analog signal, provides information as to the lateral acceleration, including the gravity field, sensed by the accelerometers as they orbit the spin axis.

For a gradiometer having its spin axis aligned along the field lines in an ideally uniform and unperturbed gravity field, each accelerometer experiences the same acceleration forces as it proceeds along its orbital path. But in situations in which the local gravity field is perturbed by the presence of one or more masses and/or the spin axis is tilted relative to the local vertical field lines, each accelerometer will experience different accelerations throughout its orbit. The quantitative output of each accelerometer, coupled with its rotary position, provides information related to the local gravity gradients.

Figure 2:
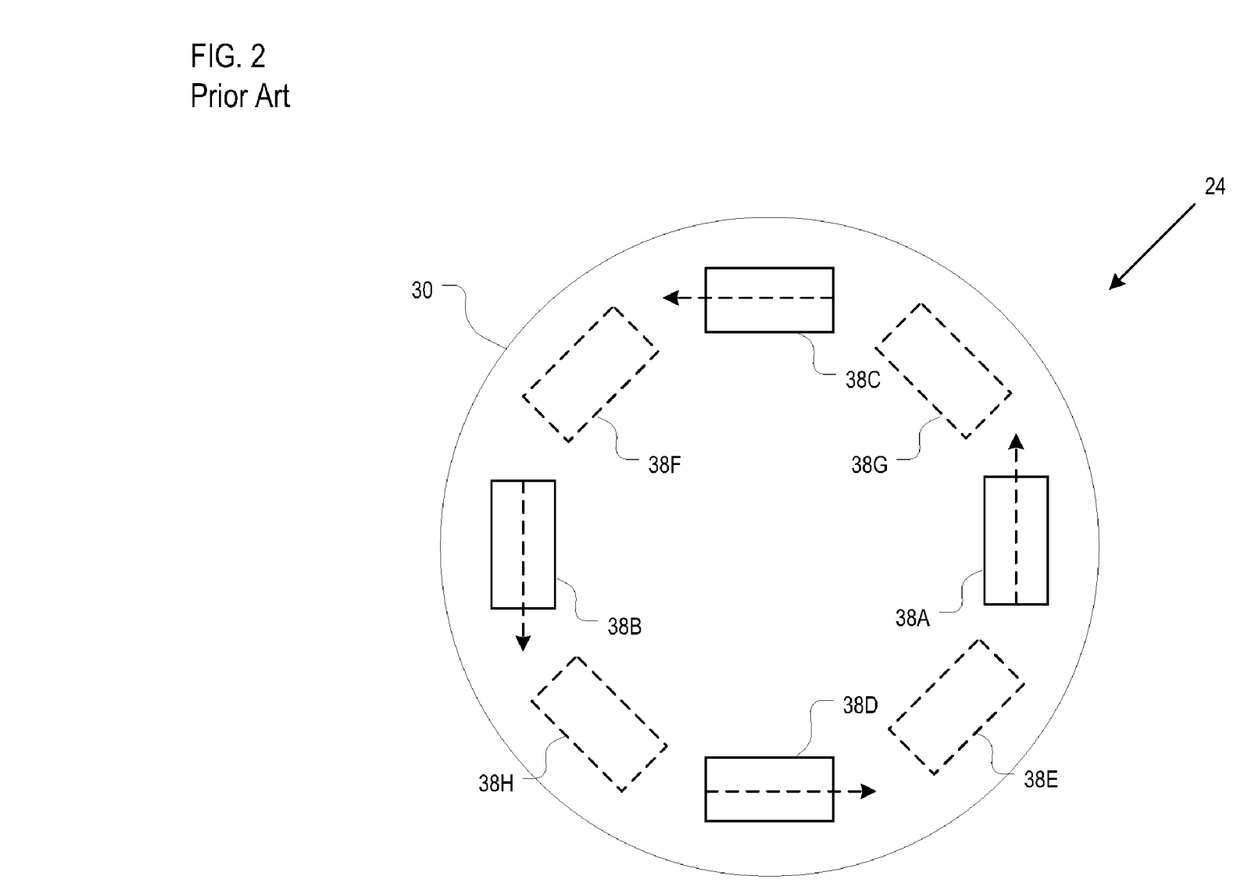
FIG. 2 depicts a disc assembly of a four-accelerometer gradiometer in the prior art.

Typically (but not necessarily), a gravity gradiometer will use either four accelerometers or eight accelerometers. FIG. 2 depicts disc assembly 24 of a four-accelerometer gradiometer. The sensitive axes of accelerometers 38A, 38B, 38C, and 38D are positioned at 90° intervals in the plane of disc or rotor 30, as shown in FIG. 2. The "sensitive axis" of an accelerometer is the directional axis along which acceleration is detected. Ideally, accelerations applied to the accelerometer orthogonal to the sensitive axis are not detected. In order to measure the gravity force, the accelerometers shown in FIG. 2 point in the direction of measured force rather than acceleration. If the instrument is subject to an actual acceleration, the perceived force will be in the direction opposite to the acceleration.

With perfect alignment and with perfectly balanced scale-factors, the sum of any single pair of diametrically-opposed accelerometers cancels common linear accelerations, but is sensitive to the difference in gravity between the accelerometers and also to angular accelerations about an axis that is normal to the sensitive plane. When static, the sum of signals from such an accelerometer pair provides a single gravity gradient plus a measure of angular acceleration.

In existing eight-accelerometer gravity gradiometers, all accelerometers are evenly spaced around the circumference of a disc and processed as if they were two superimposed four-accelerometer gravity gradiometers, offset by 45°. With reference to FIG. 2, four additional accelerometers 38E, 38F, 38G, and 38H are shown in phantom at the appropriate locations to provide an eight-accelerometer gravity gradiometer.

Any single disc of either four or eight accelerometers measures only two gradients. (The four additional accelerometers in an eight-accelerometer design enable, through redundant measurements, an increase in the signal-to-noise ratio of the gravitational-field measurement. But they do not enable the measurement of additional gradients.)

To measure all independent elements of the gradient tensor on a moving vehicle, three discs rotating about three mutually-orthogonal axes are used. Typically, each disc carries a set of four accelerometers. Full tensor gravity gradiometer 10 is depicted in FIG. 3.

Figure 3:
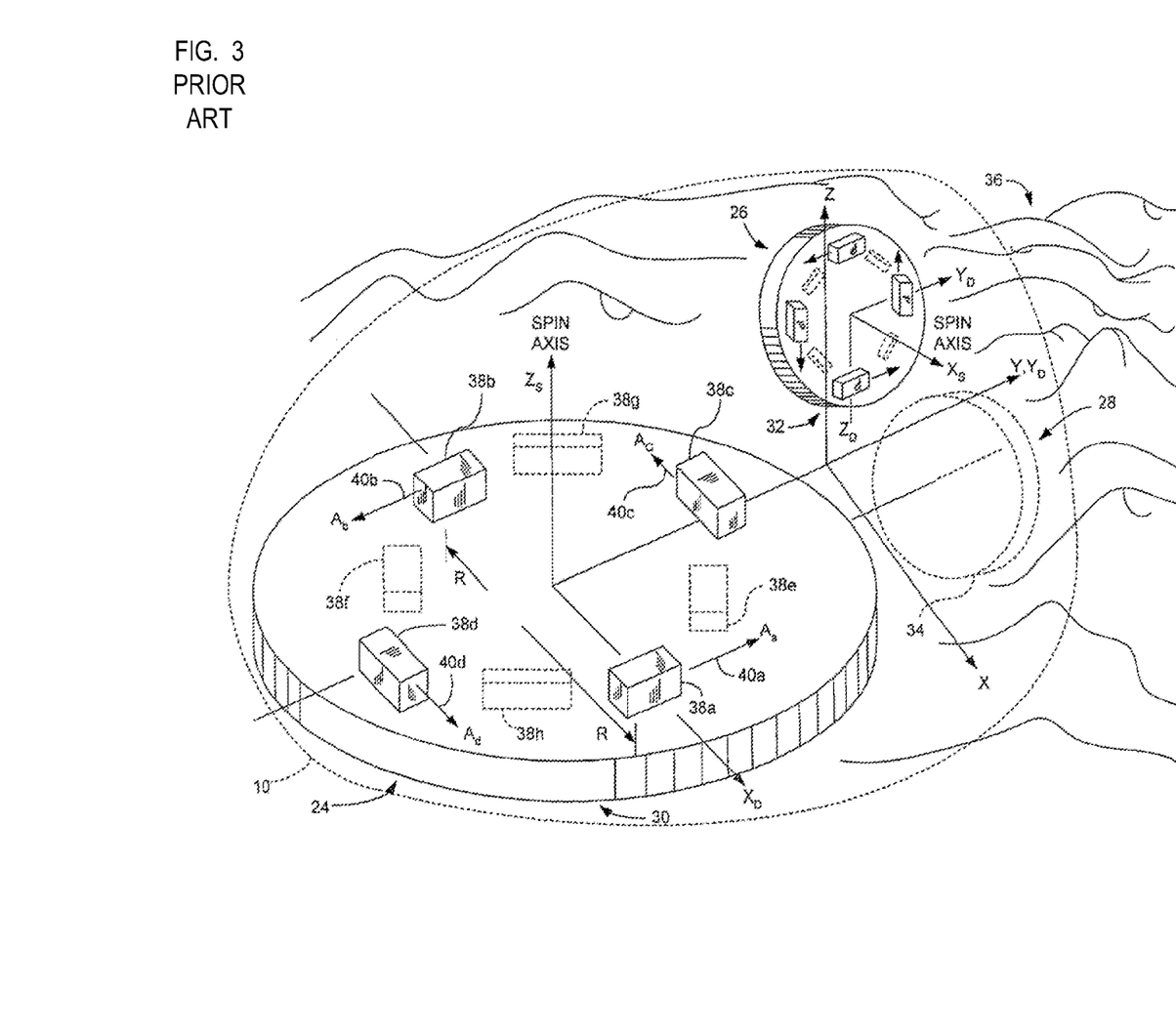
FIG. 3 depicts a prior-art gravity gradiometer having three disc assemblies.

As depicted in FIG. 3, gravity gradiometer 10 has three disc assemblies 24, 26, and 28 having respective discs 30, 32, and 34. These discs are mounted in a respective plane that is coincident or parallel with one of the three body-axis planes such that the spin axis of the disc is either coincident with or parallel to the body axis that is normal to the mounting plane. Furthermore, each disc is characterized by orthogonal disc axes that lie in but rotate relative to the mounting plane.

For example, disc 30 lies in the X-Y body-axis plane, has a spin axis $Z_s$ that is parallel to the Z body axis (i.e., the x-y coordinates of $Z_s$ are x=C1 and y=C2 where C1 and C2 are constants), and includes orthogonal disc axes $X_D$ and $Y_D$. As disc 30 rotates (in a counterclockwise direction in this example), disc axes $X_D$ and $Y_D$ rotate relative to the non-rotating X and Y body axes. At the instant of time shown in FIG. 3, the $X_D$ and $Y_D$ disc axes of disc 30 are respectively parallel and coincident with the X and Y body axes.

Disc 32 lies in a plane that is parallel to the Y-Z body-axis plane and has a spin axis $X_s$ that is parallel to the X body axis. At the instant of time shown in FIG. 3, $Y_D$ and $Z_D$ disc axes of disc 32 are respectively parallel and coincident with the Y and Z body axes. For clarity, little detail regarding disc 34 is provided. It can be seen, however, that disc 34 lies in a plane that is parallel to the Z-X body-axis plane and has a spin axis that is parallel to the Y body axis.

Disc assemblies 24, 26, and 28 each include two pairs of accelerometers. (Although gradiometer 10 includes two pairs of accelerometers per disc, measurements could be obtained with only one pair of accelerometers per disc.) For brevity, only disc assembly 24 will be discussed.

Disc assembly 24 includes respective pairs of accelerometers 38a, 38b and 38c, 38d. Each accelerometer 38a, 38b and 38c, 38d includes a respective input axis 40a, 40b and 40c, 40d along which the accelerometer measures a respective acceleration magnitude $A_a$, $A_b$, $A_c$, and $A_d$. Each accelerometer is mounted to disc 30 such that its input axis is a radius R from the spin axis $Z_s$ and is perpendicular to R. In some other embodiments, input axes 40a, 40b and 40c, 40d are oriented at other angles relative to R. This can occur intentionally or as a result of manufacturing imperfections.

Briefly, the gradient of the gravity field is measured as the difference in readings between the opposing pairs of accelerometers on each disc. Measurements from each disc assembly 24, 26, 28 can be resolved into two gradients in the plane of the respective rotating disc. The tensor components measured in the external coordinate axis directions are obtained by forming the appropriate linear combinations of the six outputs (i.e., two gradients from each disc).

It is understood that there are other elements of a gradiometer, such as a gimbaling system and processor and/or memory that are not shown in FIG. 3. More particularly, a full tensor gravity gradiometer includes a gimbaling system for rotational isolation. The gimbaling system typically includes a rotational sensor assembly, such as a gyroscope, for measuring rotational activity about the X, Y, and Z axes. Control signals derived from the sensor measurements are fed back to motors that are attached to the gimbal axes to reduce the rotations experienced by the gradiometer.

It is impossible, however, to completely eliminate such rotations, and tensor measurements will be additively corrupted by the presence of gradient signals due to these rotations. These additional, non-gravitational gradients are simple deterministic functions of the rotational rates. Therefore, the measurements from the gradiometer have these corrupting signals subtracted by the processor. In some embodiments, the processor is external to the gradiometer. In such embodiments, the gradiometer often includes a memory for storing measurement data for download to the external processor. In some further embodiments, the gradiometer includes a transmitter for transmitting measurement data to an external processor and/or memory.

The operation of the disc assemblies and the processing of signals therefrom to determine the gravity gradient are well understood to those skilled in the art. Further description of the operation of the disc assemblies and signal processing is provided, for example, in U.S. Pat. No. 6,799,459, which is incorporated herein by reference. See also, U.S. Pats. No. 5,357,802, 6,212,952, and 6,658,935, all incorporated herein by reference, which provide disclosure concerning four- and/or eight-accelerometer gravity gradiometers.

The gravity gradiometer described above is capable of extraordinary accuracy (i.e., accurate to about 1 Eo). Yet, it is subject to a variety of error mechanisms that can adversely affect its performance. A few such error mechanisms are described below.

Accelerometer Misalignment

The net misalignment, in the axial and radial directions, of the accelerometers on a disc can severely impact system performance. Although mechanical alignment of the accelerometer sensitive axes is carefully adjusted prior to commissioning the gradiometer, misalignments routinely remain. In certain gradiometer systems, the pendulous axes of the accelerometer coincide with the rotation axis. Therefore, by changing the accelerometer null position, fine realignment of the accelerometer in the axial direction is possible. But tangential realignment is not possible. In some other gradiometer systems, the accelerometers are mounted such that the pendulous axes have tangential as well as axial components. As a consequence, it is possible to realign the accelerometers electronically so that tangential misalignments are reduced. But doing so affects axial alignment. Unfortunately, axial and tangential alignments are not independently adjustable.

Instrument Rotation

Rotating gravity gradiometers intentionally modulate the gravity gradient via instrument rotation so that low-frequency gravity signals are moved away from the larger instrument error frequencies. The instrument errors, though no longer having power spectral density peaks coinciding with the modulated gravity gradient signals, still corrupt measurements at harmonics of the rotation rate and nearby frequencies. The strength of the instrument errors near harmonics of the rotation rate and near DC reduced the accuracy of the measurements at corresponding frequencies. By way of example, DC errors in the instrument frame cause the measurements of gradients near twice the rotation rate to be unusable.

Accelerometer Bias Matching and Scale Factor Balancing

Part of the difficulty in manufacturing gravity gradiometers comes from the need to balance, to a high degree, signal components of the various accelerometers composing the gradiometer measurement.

Examples of this include accelerometer (1) bias matching and (2) scale factor balance. Regarding (1), when building a gradiometer having a standard complement of four accelerometers, a substantially greater number of accelerometers must be made so that four can be selected that are sufficiently matched in bias values to enable the sum of the accelerometers to have a low net value. This low value is required to avoid instrumentation saturation problems and to keep noise problems related to offsetting a large sum at insignificant levels.

Regarding (2), gradiometers can operate in a maneuvering vehicle because the accelerometer pairs which are differenced in order to obtain a measurement of the gradient each sense the same maneuvering accelerations. In order for this to happen to the high degree of accuracy required, the accelerometers used in gradiometers have been required to have an alterable scale factor. This is required because it is practically impossible to ensure that, during manufacture, accelerometer scale factors will match sufficiently to accurately reject ambient accelerations when differenced.

Bias matching and scale factor balancing therefore add substantial complexity to the design and manufacture of gradiometer-ready accelerometers.

Unknown Rotational Rates

All systems that measure gravity gradients can be corrupted by unknown rotational rates. The usual solution for this has been to reduce rotational rates to a low level and, if necessary, apply compensations to the gradient measurements based on measurements of the residual rotational rates experienced by the gradiometer. In non-moving-base applications, this reduction of rotational rates is usually implemented in a passive mechanical fashion. For moving-base applications, and for instances in which ambient vibration levels would defeat a passive isolation system, active stabilization must be implemented. This is usually accomplished by placing all gradient sensors (i.e., the discs) on a common, fully-gimbaled platform on which a three-axis rotational stabilization system has been implemented.

The fully-isolated gimbal system adds substantial expense, size, and complexity to the gradiometer.

Design Constraints for Rejecting Rotational Accelerations

A measurement of an element of the gravity gradient tensor shows how one component of the gravity acceleration vector differs from the same vector component at a different location at the same time. Acceleration measurements at the two locations are differenced to remove the effect of common linear accelerations. But the measurements are not immune to differential motion. If both acceleration measurements are referenced to a common instrumentation block, the differential motion is caused by a rotation of the block around an axis that is orthogonal to both the position vector that separates the measurement locations and the measurement axis.

In the prior art, the rotational acceleration is rejected by adding a second acceleration difference measurement with sensitive axis and displacement vector interchanged from the first pair. This second pair of accelerometers also provides a measurement of the same gradient as the first pair, but in addition measures the rotational acceleration with opposite polarity. Adding this second measurement pair provides, as its primary purpose, the rejection of rotational accelerations.

Based on the aforementioned considerations, prior-art gradiometer designs are typically constrained with regard to the placement of accelerometers on the disc, the periodic nature of the disc rotation, and the demodulation frequency, among other parameters. In practice, these idealized configurations are never achieved. That is, the accelerometers in a complement are never exactly at 90°, the complements are never precisely regular in terms of position or orientation, the summation of never exactly reflects the true sum of the experienced accelerations, and the rotation is never truly periodic.

The various error mechanism discussed above (i.e., accelerometer misalignment, instrument rotation, scale and bias factor discrepancies, unknown rotational rates, and differential motion) are defined for reference herein and in the appended claims as "gravity gradiometer error mechanism(s)."

Identifying the Full Gravity Gradient Tensor

To identify the full gravity tensor, a minimum of five independent gradient components must be measured. Gradiometers that measure the full tensor typically use three accelerometer complements on three separate discs, all mounted on a stabilized platform. The drawbacks of this arrangement are the size of the resulting device, the relative vibration between sensors, and the spatial separation of the sensors. These latter two issues are additional error sources.

When stabilization sensors are separate from gradient sensors, relative vibration and resonance problems occur. When compensation sensors are separate from gradient sensors, problems related to relative motion, bandwidth, and dynamic response arise. Small gradiometers use modulation to measure two gradients, but with limited bandwidth. Large gradiometers have a wide bandwidth, but have been too large to use in a full tensor system. Current gradiometers are therefore limited to some degree by the number of gradients measured, bandwidth, size, vibration sensitivity, or problems of sensor distribution. Simply put, few if any gradiometer can measure the full tensor in a compact device.

In view of the foregoing, improvements in gravity gradiometer design would be beneficial.

SUMMARY

The present invention provides improved gravity gradiometers that are immune to one or more gravity gradiometer error mechanisms or that otherwise reduce the impact of such error mechanisms.

In accordance with the illustrative embodiment of the present invention, an improved gravity gradiometer includes "means for addressing at least one or more gravity gradiometer error mechanism." In the illustrative embodiment, the various "means" disclosed in this specification are used to improve gravity gradiometers such as those described in U.S. Pat. Nos. 5,357,802, 6,212,952, 6,658,935, and 6,799,459, and depicted in FIGS. 3 and 4. As used in the "means clause" above, the phrase "means for addressing" signifies an alteration to the conventional gradiometer design (e.g., a change in the way accelerometers are arranged, introduction of an additional measurement device, a change in processing technique, etc.) that impacts one or more of the error mechanisms in such as way as to: (1) increase measurement accuracy of the gravity gradiometer and/or (2) relaxing design constraints as to various elements of the gravity gradiometer to result in an overall reduction in gradiometer cost and/or increased yield of the various elements used in the gradiometer.

In some other embodiments, the various means for addressing at least one or more gravity gradiometer error mechanism are used to improve other types of gravity gradiometers. In conjunction with the present disclosure, those skilled in the art will be able to modify the various means disclosed herein, as appropriate, for use with such other types of gravity gradiometers.

For each of the gravity gradiometer error mechanisms discussed above, at least one "means" for addressing the error mechanism is provided in the Detailed Description section that follows. A brief summary of the approaches that are used to address the various error mechanisms is provided below.

Accelerometer Misalignment

Misalignments of individual accelerometers are of far less concern than the net misalignments of the four accelerometers in a gradiometer complement. As a consequence, the present inventors recognized that if the accelerometers are mounted on the disc such that their pendulous axes have differing components in the axial and tangential directions, it is possible to electronically adjust the null positions of the individual accelerometers to enable independent net realignment in both directions (i.e., axial and tangential).

Instrument Rotation

The present inventors recognized that if two co-located (or nearly co-located) gradiometer complements are rotated at two appropriately-selected different rates, $\omega_1$ and $\omega_2$, the measurements therefrom can be combined to provide a greater bandwidth than would be the case if the complements were rotating at the same rate.

Accelerometer Bias Matching and Scale Factor Balancing

The present inventors recognized that it is possible to improve gradiometer performance with relaxed accelerometer performance requirements. The idea is to deliberately increase contributions from certain error sources, as long as the errors can be subsequently compensated and if they balance instrument errors that were allowed by virtue of the relaxed requirements. Improved gradiometer performance is a bonus; even if the system simply maintains its level of performance, this has been achieved with a simplified and therefore less-expensive accelerometer design and with improved yield of gradiometer-acceptable accelerometers.

Unknown Rotational Rates

The present inventors recognized that in gradiometer systems, not all axes have the same stabilization requirements. For example, in a single disc gradiometer system, the stabilization requirements around the axis of rotation are order of magnitude less stringent than around the other two axes. In accordance with one aspect of the present invention, this is exploited by implementing a minimally-stabilized gradiometer, wherein active high-gain rejection is provided for only one of the two more sensitive axes.

Design Constraints for Rejecting Rotational Accelerations

As previously discussed, the primary purpose of the second pair of accelerometers in a four-accelerometer complement is the rejection of rotational accelerations. In accordance with some aspects of the present invention, alternative methods for force-difference measurements and alternative rotational compensations are disclosed. Using these other methods results in relaxing design constraints that have traditionally been applied to gravity gradiometers, thereby providing far more flexibility in selecting instrument configuration.

Identifying the Full Gravity Gradient Tensor

To address the problems inherent in existing gradiometers designs, a full tensor polyhedral gravity gradiometer is disclosed. The gradiometer has three sets of six accelerometers, which occupy eighteen faces of a single polyhedral instrument block. In each set, the sensitive axes of the accelerometers are co-planar and point along six of the eight sides of a regular octagon. The other two sides of the octagon are occupied by an accelerometer from each of the other two sets. The planes of the three accelerometer sets are orthogonal to one another.

BRIEF DESCRIPTION OF THE DRAWINGS

FIG. 7 depicts a co-planar group of six accelerometers from the polyhedral gravity gradiometer of FIG. 6.

DETAILED DESCRIPTION

Accelerometer Misalignment

Figure 4:
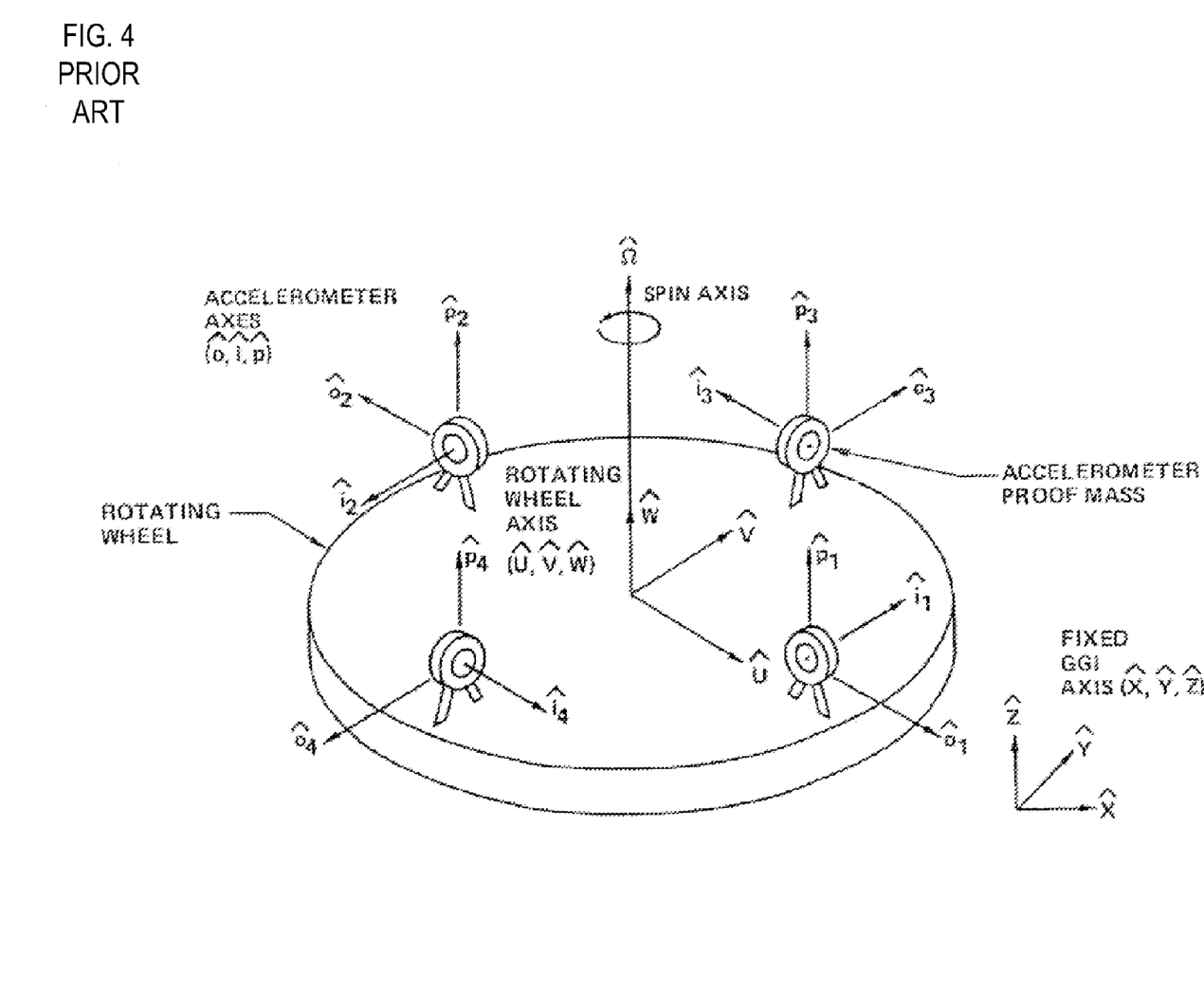
FIG. 4 depicts a proof mass support arrangement in the prior art wherein the pendulous axes ($P_i$) aligns with the spin axis W.

FIG. 4 depicts the proof mass support arrangement in the prior art wherein the pendulous axes ($P_i$) aligns with the spin axis W. As previously disclosed, the net misalignment, in the axial and radial directions, of the accelerometers on a disc can severely impact system performance. In prior-art mounting arrangements, axial and tangential alignments are not independently adjustable.

Misalignments of individual accelerometers are of far less concern than the net misalignments of the four accelerometers in a gradiometer complement. As a consequence, if the accelerometers are mounted on the disc such that their pendulous axes have differing components in the axial and tangential directions, it is possible to electronically adjust the null positions of the individual accelerometers to enable independent net realignment in both directions (i.e., axial and tangential).

Figure 5:
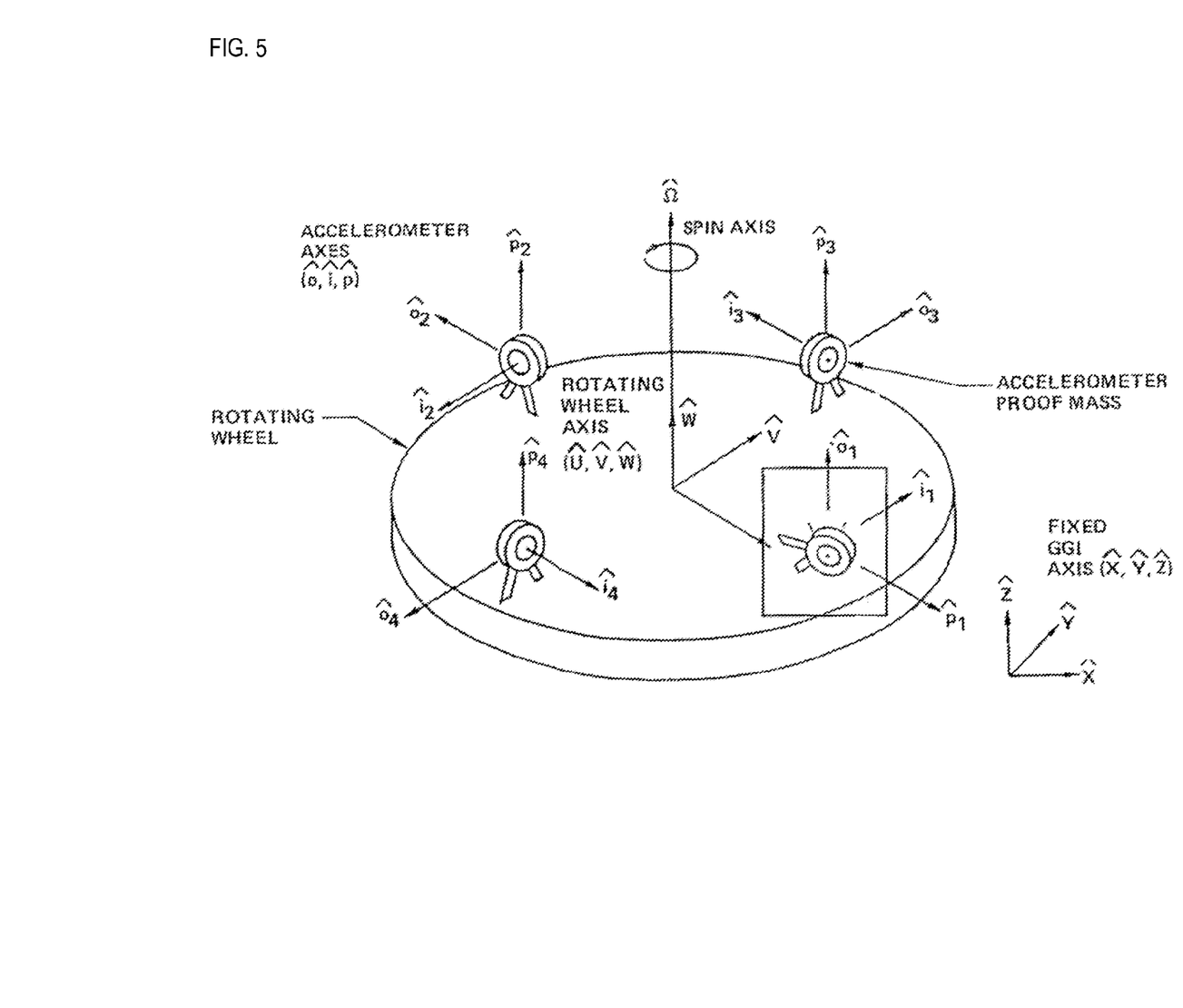
FIG. 5 depicts a proof mass support arrangement in accordance with the illustrative embodiment wherein the pendulous axis of at least one accelerometer is not aligned with the spin axis.

FIG. 5 depicts a proof mass support arrangement in accordance with the illustrative embodiment wherein the pendulous axis of at least one accelerometer is not aligned with the spin axis. For example, in FIG. 5, pendulous axis $P_1$ of accelerometer 1 is not aligned with spin axis W. This enables adjustment in both directions.

More particularly, the inventive mounting arrangement enables realignment of input axes (i) toward pendulous axes P for controlling:

net axial misalignment (e.g., see FIG. 5: the sum of $i_2$, $i_3$, and $i_4$ adjustments);

net radial misalignment (e.g., see FIG. 5: $i_1$ adjustment);

differential axial misalignment U, (e.g., see FIG. 5: the difference of $i_3$ and $i_4$ adjustments); and differential axial misalignment V, (e.g., see FIG. 5: $i_2$ adjustment).

Therefore, in some embodiments, "means for addressing at least one or more gravity gradiometer error mechanism" comprises:

an arrangement wherein a pendulous axis of at least one of the accelerometers of the plurality thereof is at a non-zero angle with respect to the spin axis of the disc.

Instrument Rotation

As previously indicated, the instrument block in all existing gradiometer systems is uniformly rotated so that after demodulation, the majority of the time-varying gradiometer errors appear at multiples of the rotation rate. The rotation rate is selected to be high enough so that the desired signal will have a maximum frequency that is lower than the expected corruption at the first rotation multiple. Limits on acceptable rotation rates lead to limits of system bandwidth unless the problem with errors at rotation harmonics can be avoided.

In accordance with an aspect of the present invention, two co-located (or nearly co-located) gradiometer complements are rotated at two appropriately-selected different rates, $\omega_1$ and $\omega_2$, and the measurements therefrom are combined. This provides a greater bandwidth than would be the case if the complements were rotating at the same rate.

More particularly, for two or more accelerometer complements rotating at different rates, the errors for each complement of accelerometers can be arranged to fall at different, non-overlapping frequencies. The complete gradient signal can be reconstructed at all frequencies by implementing a frequency-dependent combination of the measurements from each suite. An example of this combining method for two gradiometer suites would be to have complementary filters for the output of each suite. The filter gain would be equal to one-half for both suites at frequencies where both suites provide accurate measurements. At other frequencies, the gain would equal zero for the poorly-performing suite and one for the well-performing suite. Note that the two (or more) discs need not have the same dimensions.

One interesting embodiment of this system has a first eight-accelerometer disc rotating at $\omega_1$ with a second complement of eight accelerometers positioned around the first disc. The second complement of eight accelerometers are not rotating; that is, $\omega_2=0$. Since the two complements of accelerometers are measuring the same gradients, they can be considered to be co-located. Measurements from the non-rotating accelerometers would be corrupted at DC, but would provide accurate measurements at all multiples of $\omega_1$.

The measurements from each complement of accelerometers is advantageously mixed using, for example, complementary filtering. Thus, at frequency f, $$\Gamma_{xy}(f)=\Gamma_{xy\_1}(f)*\text{Filter}(f)+\Gamma_{xy\_2}(f)*(1-\text{Filter}(f)) \quad [4]$$

One choice for Filter(f) is:

$$\text{Filter}(f)=\text{noise}PSD_{complement1}(f)/(\text{noise}PSD_{complement1}(f)+\text{noise}PSD_{complement1}(f)) \quad [5]$$

Consider an embodiment in which a gravity gradiometer has a first plurality of accelerometers, wherein the first plurality of accelerometers are disposed on a first disc, and further wherein the first disc is rotating at a first rate of rotation. Then, consistent with the foregoing, in some embodiments, "means for addressing at least one or more gravity gradiometer error mechanism" comprises:

a second plurality of accelerometers, wherein the second plurality of accelerometers are not disposed on the first disc, and further wherein the second plurality of accelerometers are either:

a) not rotating; or
b) rotating at a second rate of rotation that is different than the first rate of rotation.

Accelerometer Bias Matching and Scale Factor Balancing

As previously discussed, during the preliminary design of most prior-art gravity gradiometers, it is assumed that (1) active accelerometer scale factor loops are a necessity and (2) careful matching of accelerometer characteristics, especially biases, is critical. The first assumption results in a complex accelerometer design that must include a capacity for scale factor control. The second assumption reduces the effective yield in the manufacture of accelerometers for gradiometer use.

As previously noted, the present inventors recognized that it is possible to improve gradiometer performance with relaxed accelerometer performance requirements. In fact, improved gradiometer performance is a bonus. If the system simply maintains its level of performance, it has been achieved with a simplified and therefore less-expensive accelerometer design and with improved yield of gradiometer-acceptable accelerometers.

In accordance with the illustrative embodiment, the contributions from certain error sources are deliberately increased. This is feasible as long as the errors can be subsequently compensated and if they balance instrument errors that were allowed by virtue of the relaxed requirements. Four approaches are described below to implement this concept.

A first implementation permits greater variation in the raw accelerometer bias levels and adjust the net bias of the sum by deliberately misaligning one or more of the accelerometers so that it will sense more of the downward component of the Earth's gravity field. This realignment will erroneously cause increased injection of axial accelerations into the accelerometer sum and, therefore, into the gradient measurements. A post-measurement compensation is applied that addresses this error. If the quality of this compensation is sufficient or if the sizes of the axial accelerations are small enough, there is a possibility of improved overall gradiometer performance. The proper balance of operational settings for best performance is a function of the measurement environment.

Consider an embodiment in which a gravity gradiometer includes a disc, wherein the disc is rotatable about a spin axis, and further includes a plurality of accelerometers, wherein the accelerometers are disposed on the disc. Then, consistent with the foregoing, in some embodiments, "means for addressing at least one or more gravity gradiometer error mechanism" comprises:

an arrangement wherein at least a first accelerometer of the plurality thereof has a first alignment and other of the accelerometers have a second alignment, and wherein:
a) the first alignment is different than the second alignment;
b) the difference between the first alignment and the second alignment causes the first accelerometer to sense a vertical component of gravity differently than accelerometers having the second alignment.

A second implementation method relaxes requirements by (1) not including a requirement for accelerometer scale factor or (2) not requiring that the control range of accelerometers be sufficient to permit the scale factors of paired accelerometers to be equalized. As a result of (1) or (2), the accelerometer summation signal will be saturated at the gradiometer rotation rate.

This can be addressed by deliberately increasing an error source that has the same quiescent frequency characteristics. In particular, if the axial alignment of one or more of the accelerometers is changed sinusoidally at the rotation rate the disc, a signal can be injected that will correct the erroneous sensing of the DC component of the Earth's gravity at the disc rotation rate.

As an example of a way to inject a sinusoidal variation to accelerometer alignment, an existing second-order compensation term that adjusts accelerometer alignment as a function of accelerometer input acceleration levels is intentionally improperly set. The source of the sinusoid is less important than the performance of the post-measurement compensation software in removing this deliberately-injected effect. In conjunction with this disclosure, those skilled in the art will be able to suitable implement such post-measurement compensation software.

A third implementation method provides error balancing of scale factor mismatch by "misaligning" the accelerometer pendulous mass supports. This misalignment provides control over accelerometer alignment in the tangential direction. This misalignment has two effects: (1) it increases sensitivity to rotational variations and (2) it causes cross-disc accelerations to be sensed incorrectly. These cross-disc accelerations are, effectively, the same signals picked up by the adjacent accelerometer in the gradiometer complement. As a consequence, the effects of scale factor error are mitigated by deliberately tangentially misaligning an adjacent accelerometer. The accuracy of this method relies on the accuracy of compensating for the effects of rotational variations.

Consider an embodiment in which a gravity gradiometer includes a disc, wherein the disc is rotatable about a spin axis, and further includes a plurality of accelerometers, wherein the accelerometers are disposed on the disc. Then, consistent with the foregoing, in some embodiments, "means for addressing at least one or more gravity gradiometer error mechanism" comprises:

an arrangement wherein a pendulous mass support of at least a first accelerometer of the plurality thereof is misaligned in such a way as to increase sensitivity to rotational variations and cause cross-disc accelerations to be sensed incorrectly.

A fourth implementation method involves incorporating an additional accelerometer having a sensitive axis that points in the same direction as erroneously injected maneuvering accelerations. The net effect of accelerometer scale factor error is imperfect rejection of linear accelerations. All gravity gradiometers rely on the stability of accelerometer scale factors, even if the scale factors themselves are not perfectly matched. This means that the orientation and scaling of the linear acceleration that is injected into the gradiometer measurements will be very stable.

In accordance with the fourth implementation method, a fifth accelerometer is added to the usual complement of four accelerometers. The sensitive axis of the fifth accelerometer is pointing in the same direction as the erroneously injected maneuvering accelerations. If the scale factors of the standard complement are balanced within a factor of X, then the signal from this additional accelerometer is attenuated by a factor of 1/X. A primary benefit of doing this is the ability to use a fifth accelerometer with significantly inferior measurement characteristics. As an example, if the scale factors of the usual complement are balance to within 1000 ppm, the signal from the additional accelerometer is attenuated by 0.001. This reduces the impact of noise power from this instrument by a factor of $10^6$ or −60 dB relative to the other accelerometers.

Consider an embodiment in which a gravity gradiometer includes a disc, wherein the disc is rotatable about a spin axis, and further includes a plurality of accelerometers, wherein the accelerometers are disposed on the disc. Then, consistent with the foregoing, in some embodiments, "means for addressing at least one or more gravity gradiometer error mechanism" comprises:

an arrangement wherein there are five accelerometers in the plurality thereof, wherein a sensitive axis of one of the accelerometers points in the same direction as erroneously injected maneuvering accelerations.

In a further aspect of the present invention, the inventors' insights with regard to bias matching and scale factor balancing provide a novel method for making a gravity gradiometer. In particular, the method comprises:

relaxing bias matching and scale factor balancing of accelerometers for use in the gravity gradiometer;

increasing an error from an error source in gravity gradiometer measurements, wherein the error source is selected from error sources that are able to balance instrument errors that arose due to relaxing the bias matching and scale factor balancing of accelerometers; and applying post-measurement compensation.

Unknown Rotational Rates

As previously noted, gravity-gradient measurements can be corrupted by unknown rotational rates. With reference to FIG. 5, the gradiometer measurements that are formed from the sum of the four accelerometers are intrinsically sensitive to the product of rotations around the U and V axes. That is, unknown rotations leading to a non-zero $\omega_u \omega_v$ product inject noise into gradiometer measurements.

For moving applications (e.g., a gravity gradiometer being carried in an aircraft), active stabilization is used to address this problem. This is done, typically, by placing all gradient sensors (e.g., accelerometers, etc.) on a common, fully-gimbaled platform on which a three-axis rotational stabilization system has been implemented (i.e., three gimbals are used). The fully-isolated gimbal system is very expensive and large, and therefore adds substantial cost and size to the gradiometer.

As previously disclosed, the present inventors recognized that in gradiometer systems, not all axes have the same stabilization requirements. In accordance with one aspect of the present invention, this is exploited by implementing a minimally-stabilized gradiometer, wherein active high-gain rejection is provided for only one of the two more sensitive axes.

In some embodiments, reduced stabilization is implemented by aligning the inner gimbal axis Z with the spin axis W, thereby rendering one of them redundant. Unfortunately, the X and Y gimbal axes cannot be so easily stabilized, because $\omega_u \omega_v$ depends on these in time-varying fashion. But, by then stabilizing either one of the U or V axes, $\omega_u \omega_v$ will be zero. As a consequence, only one axis of the gradiometer system has an absolute requirement for stabilization/compensation. Therefore, embodiments employing this aspect of the invention do not require a three-axis stabilized, three-gimbal system for stabilization. Rather, some embodiments will incorporate only a single gimbal for stabilization. Some embodiments will not incorporate any gimbals; rather, rotational stabilization can be implemented directly to the system that rotates the accelerometer-bearing disc.

Consider an embodiment in which a gravity gradiometer includes a disc that is coupled to a gimbal system, wherein the disc is rotatable about a spin axis, and further includes a plurality of accelerometers, wherein the accelerometers are disposed on the disc. Then, consistent with the foregoing, in some embodiments, "means for addressing at least one or more gravity gradiometer error mechanism" comprises:

an arrangement wherein a Z-axis of the gimbal is aligned with the spin axis of the gravity gradiometer and one, but not both, of the X axis of the gimbal and the Y axis of the gimbal is stabilized.

Design Constraints for Rejecting Rotational Accelerations

In gradiometry, measured force differences are so small that compensations must be made for motion-induced accelerations (i.e., rotational motion) that are not identical at both measurement locations. As previously discussed, the primary purpose of the second pair of accelerometers in a four-accelerometer complement is the rejection of such rotational accelerations. In accordance with some aspects of the present invention, alternative methods for force-difference measurements and alternative rotational compensations are disclosed. Use of these other sources relaxes design constraints that have traditionally been applied to gravity gradiometers, thereby providing far more flexibility in selecting instrument configuration.

Examples of such alternative embodiments include:

a) A different accelerometer pair at any orientation around the disc. Prior-art gradiometer designs rely on obtaining difference measurements from two accelerometers that have sensitive axes aligned with each other. The present inventors recognized that these measurements can come from a "phantom" instrument, which is actually the appropriately-combined measurements from two or more other accelerometers with different sensitive axes. These other accelerometers need not even be in the plane defined by the displacement vector and the effective sensitive axis. For example, in x, y, z coordinates, two accelerometers used in measuring the xy gradient might have sensitive axes 0, 1, 1 and 0, 1, −1, which are combined to give an effective measurement of 0, 1, 0. When this effective measurement is differenced with a y-sensitive accelerometer that is displaced in the x direction, it will provide a measurement of the xy gradient.

b) Any accelerometer combination that rejects linear accelerations while passing rotational accelerations. For example, irregularly-spaced accelerometers can form valid gradient measurements. Accelerometers so spaced need to be combined in proportions that are suitable for rejection linear accelerations, passing rotational accelerations, and forming force-difference measurements.

c) Alternative instrumentation for obtaining rotational acceleration compensation, such as, for example, a magnetohydrodynamic sensor. The MHD sensor directly measures angular acceleration rates. The compensating signal that required, in the prior art, combinations of accelerometer measurements, is proportional to the output of the MHD sensor. As a consequence, a two-accelerometer design is implemented (for measuring one of the torsional gradients) or a three-accelerometer design is implemented to measure both torsional gradients.

d) Weighted combinations of accelerometer measurements who resulting sum rejects linear motions while passing rotational accelerations (e.g., accelerometers at 0, 135, and 225 degrees whose outputs are summed after weighting by 1.414 (root 2), 1.0, and 1.0, respectively);

e) Combinations and partial combinations of a) through d), above.

Consider an embodiment in which a gravity gradiometer includes a disc that is rotatable about a spin axis, and further includes a plurality of accelerometers, wherein the accelerometers are disposed on the disc.

Consistent with alternative embodiment A above, in some embodiments, "means for addressing at least one or more gravity gradiometer error mechanism" comprises: an arrangement wherein the plurality of accelerometers comprises a first pair of accelerometers disposed on the disc and a second pair of accelerometers disposed on the disc, wherein a sensitive axis and a displacement vector of the second pair is not 180 degrees different from a sensitive axis and a displacement vector of the first pair.

Consistent with alternative embodiment B above, in some embodiments, "means for addressing at least one or more gravity gradiometer error mechanism" comprises: An arrangement wherein the plurality of accelerometers are irregularly spaced apart from one another on the disc.

Consistent with alternative embodiment B above, in some embodiments, "means for addressing at least one or more gravity gradiometer error mechanism" comprises: an arrangement for measuring one gravity gradient wherein the plurality of accelerometers comprises a first pair of accelerometers disposed on the disc and a magnetohydrodynamic sensor for directly measuring angular acceleration rates.

Consistent with alternative embodiment C above, in some embodiments, "means for addressing at least one or more gravity gradiometer error mechanism" comprises: an arrangement for measuring two gravity gradients wherein the plurality of accelerometers comprises three accelerometers disposed on the disc and a magnetohydrodynamic sensor for directly measuring angular acceleration rates.

Identifying the Full Gravity Gradient Tensor

Figure 6:
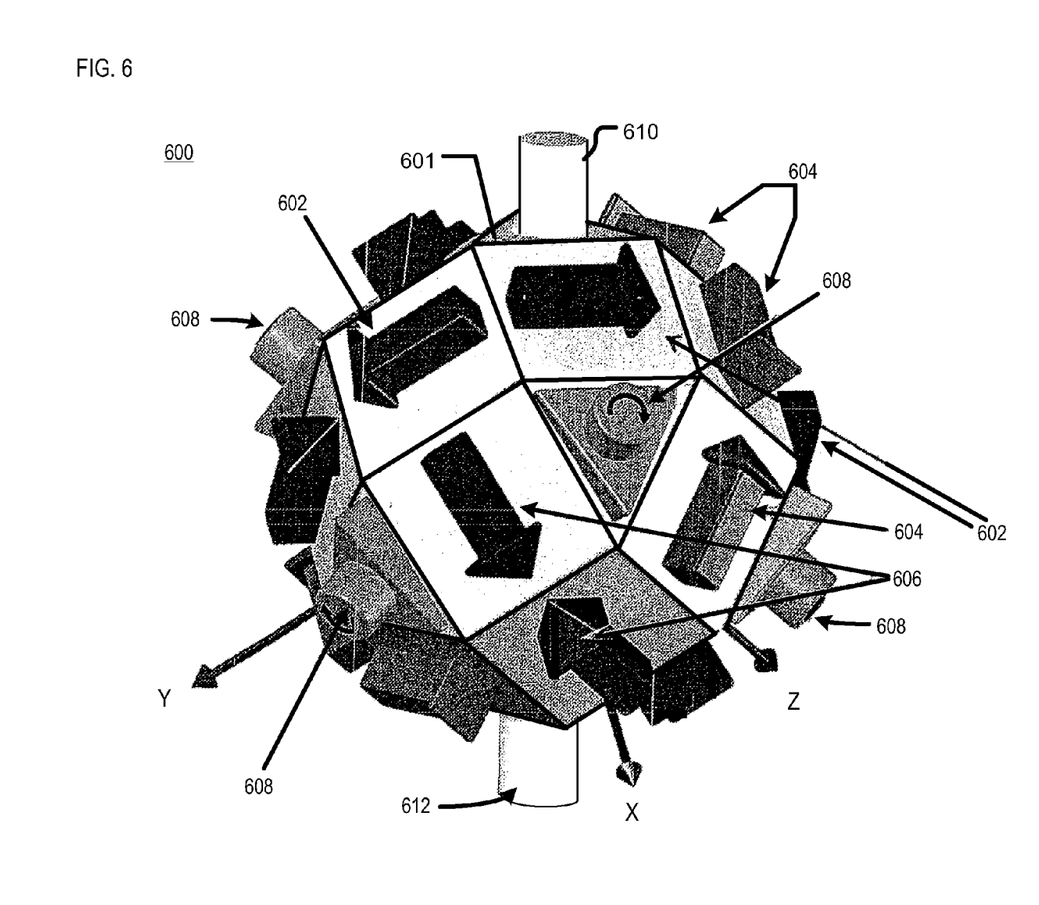
FIG. 6 depicts a polyhedral gravity gradiometer in accordance with an illustrative embodiment of the present invention.

Polyhedral gravity gradiometer 600 in accordance with the illustrative embodiment is depicted in FIG. 6. This gradiometer has three sets 602, 604, and 606 of six accelerometers, which occupy eighteen faces of a single polyhedral instrument block 601. In each set, the sensitive axes of the accelerometers are co-planar and point along six of the eight sides of a regular octagon. The other two sides of the octagon are occupied by an accelerometer from each of the other two sets. The planes of the three accelerometer sets are orthogonal to one another.

By obtaining sums and differences of accelerometers in a single plane in the correct sequence, two gradient components can be extracted while canceling linear and angular accelerations and maintaining the signals within a practical dynamic range. More particularly, and with reference to accelerometer set 604 to FIG. 7, six accelerometers (i.e., $a_1$ through $a_6$) are combined as two groups of four, as follows:

$$[A_1+A_2+A_3+A_4]/D=[\Gamma_{xx}-\Gamma_{yy}]/2-\Gamma_{xy} \quad [6]$$

$$[A_1+A_2+A_5+A_6]/D=[\Gamma_{xx}-\Gamma_{yy}]/2-\Gamma_{xy} \quad [7]$$

This method uses three pairs of accelerometers $A_1$, $A_2$; $A_3$, $A_4$; and $A_5$, $A_6$.

Similar processing of the other accelerometer planes provides a total of six gradients, at least five of which are independent, therefore providing the full gravity tensor.

In some embodiments, vacant faces on the polyhedral instrument block are used to mount angular rate sensors 608 (see, FIG. 6) for measuring along at least three orthogonal directions.

The polyhedral instrument block also includes attachment devices 610 and 612, so that the block forms the inner element of a gimbal system. Gimbal drives are controlled by combinations of the signals from the accelerometers and angular rate sensors that are mounted on the instrument block. In this fashion, the instrument block is stabilized against external motion and subjected to patterns of motion in inertial space (e.g., coning), whether the system is mounted in a static environment or in a moving vehicle. The applied motions are used to estimate error mechanisms and calibrate the sensors.

Embodiments of the polyhedral gravity gradiometer described herein have the following characteristics:

All independent gradients of the tensor are measured;

All sensors are mounted on a single, compact structure;

High rigidity, by virtue of its single-structure arrangement, especially relative to the prior-art full tensor gradiometers;

The bandwidth of gradient measurements is not limited by modulation;

Stabilization and applied motion are controlled by sensors that mounted on the same rigid structure as the gradient measurement sensors.

Sensors for gradient error control and compensation are mounted on the same rigid structure as the gradient measurement sensors.

The last two characteristics result in an improved rejection of vehicle motion in the gradient measurements.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A gravity gradiometer comprising:
a first disc, wherein the disc is rotatable about a spin axis; and
a first plurality of accelerometers, wherein the first plurality of accelerometers are disposed on the first disc, and further wherein the first disc is rotating at a first rate of rotation; and
means for addressing at least one or more gravity gradiometer error mechanisms, wherein the means for addressing at least one or more gravity gradiometer error mechanisms comprises a second plurality of accelerometers, wherein the second plurality of accelerometers are not disposed on the first disc, and further wherein the second plurality of accelerometers are either: a) not rotating; or b) rotating at a second rate of rotation that is different than the first rate of rotation.

2. A gravity gradiometer comprising:
a first disc, wherein the disc is rotatable about a spin axis; and
a first plurality of accelerometers, wherein the first plurality of accelerometers are disposed on the first disc, and further wherein the first disc is rotating at a first rate of rotation; and
means for addressing at least one or more gravity gradiometer error mechanisms, wherein the means for addressing at least one or more gravity gradiometer error mechanisms comprises an arrangement wherein a pendulous mass support of at least a first accelerometer of the plurality thereof is configured to be misaligned tangentially relative to an adjacent accelerometer in such a way as to increase sensitivity to rotational variations and cause cross-disc accelerations to be sensed incorrectly.

3. A gravity gradiometer comprising:
a first disc, wherein the disc is rotatable about a spin axis; and
a first plurality of accelerometers, wherein the first plurality of accelerometers are disposed on the first disc, and further wherein the first disc is rotating at a first rate of rotation; and
means for addressing at least one or more gravity gradiometer error mechanisms, wherein the means for addressing at least one or more gravity gradiometer error mechanisms comprises an arrangement wherein there are five accelerometers in the first plurality thereof, wherein a sensitive axis of one of the accelerometers points in the same direction as erroneously injected maneuvering accelerations.

4. A gravity qradiometer comprising:
a first disc, wherein the disc is rotatable about a spin axis; and
a first plurality of accelerometers, wherein the first plurality of accelerometers are disposed on the first disc, and further wherein the first disc is rotating at a first rate of rotation; and
means for addressing at least one or more gravity qradiometer error mechanisms, wherein the disc is coupled to a gimbal, and wherein means for addressing at least one or more gravity gradiometer error mechanisms comprises an arrangement wherein a Z-axis of the gimbal is aligned with the spin axis of the gravity gradiometer and one, but not both, of the X axis of the gimbal and the Y axis of the gimbal is stabilized.

5. A gravity qradiometer comprising:
a first disc, wherein the disc is rotatable about a spin axis; and
a first plurality of accelerometers, wherein the first plurality of accelerometers are disposed on the first disc, and further wherein the first disc is rotating at a first rate of rotation; and
means for addressing at least one or more gravity qradiometer error mechanisms, wherein the means for addressing at least one or more gravity gradiometer error mechanisms comprises an arrangement wherein the plurality of accelerometers comprises a first pair of accelerometers disposed on the first disc and a second pair of accelerometers disposed on the first disc, wherein a sensitive axis and a displacement vector of the second pair of accelerometers is not 180 degrees different from a sensitive axis and a displacement vector of the first pair of accelerometers.

6. A gravity qradiometer comprising:
a first disc rotatable about a spin axis at a first rate of rotation;
a plurality of accelerometers, wherein the plurality of accelerometers are disposed on the first disc, and further wherein the first disc is rotating; and
means for addressing at least one or more gravity qradiometer error mechanisms, wherein the means for addressing at least one or more gravity gradiometer error mechanisms comprises an arrangement for measuring one gravity gradient wherein the plurality of accelerometers consists of a first pair of accelerometers disposed on the first disc and a magnetohydrodynamic sensor for directly measuring angular acceleration rates.

7. A gravity gradiometer comprising:
a first disc rotatable about a spin axis at a first rate of rotation;
a plurality of accelerometers, wherein the plurality of accelerometers are disposed on the first disc, and further wherein the first disc is rotating; and
means for addressing at least one or more gravity gradiometer error mechanisms, wherein the means for addressing at least one or more gravity gradiometer error mechanisms comprises an arrangement for measuring two gravity gradients wherein the plurality of accelerometers consists of three accelerometers disposed on the first disc and a magnetohydrodynamic sensor for directly measuring angular acceleration rates.

* * * * *